United States Patent

Mizouchi et al.

[11] Patent Number: 5,905,597
[45] Date of Patent: May 18, 1999

[54] OPTICAL APPARATUS

[75] Inventors: Satoru Mizouchi, Utsunomiya; Tsunefumi Tanaka, Yokohama, both of Japan

[73] Assignee: Canon Kabushiki Kaisha, Tokyo, Japan

[21] Appl. No.: 08/544,178

[22] Filed: Oct. 17, 1995

[30] Foreign Application Priority Data

Oct. 20, 1994 [JP] Japan ................................. 6-281166

[51] Int. Cl.$^6$ .......................... G02B 13/08; G02B 27/10; G02B 3/02
[52] U.S. Cl. .......................... 359/671; 359/668; 359/619; 359/711; 359/720
[58] Field of Search .................. 359/668, 671, 359/619, 711, 720

[56] References Cited

U.S. PATENT DOCUMENTS

| 5,184,223 | 2/1993 | Mihara | 359/668 |
| 5,191,474 | 3/1993 | Suzuki et al. | 359/668 |
| 5,202,708 | 4/1993 | Sasaki et al. | 351/206 |
| 5,444,574 | 8/1995 | Ono et al. | 359/709 |
| 5,598,205 | 1/1997 | Nishioka | 359/720 |

FOREIGN PATENT DOCUMENTS 40-5346538 12/1993 Japan .................................. 359/668

OTHER PUBLICATIONS

Pennington et al, "CCD Imaging Array Combining Fly's-Eye Lens with TDI for Increased Light-Gathering Ability," IBM Technical Disclosure Bulletin, vol. 21 No. 2, Jul. 1978.

*Primary Examiner*—David C. Nelms
*Assistant Examiner*—Evelyn A. Lester
*Attorney, Agent, or Firm*—Robin, Blecker, Daley and Driscoll

[57] ABSTRACT

The present invention is characterized in that when a phototaking lens system forms image information on a image pickup device in which a plurality of light-receiving elements are arranged in a non-square lattice pattern and a signal from the image pickup device is sampled in a square lattice to obtain a two-dimensional digital image, the phototaking lens system forms an image as optically correcting for a distortion of aspect ratio of image caused upon sampling in the square lattice.

5 Claims, 10 Drawing Sheets

FIG. 9A
F/2.5
SPHERICAL ABERRATION

FIG. 9B
2ω = 47°
ASTIGMATISM

FIG. 9C
2ω = 47°
DISTORTION

FIG. 9D
F/2.5
SPHERICAL ABERRATION

FIG. 9E
2ω = 47°
ASTIGMATISM

FIG. 9F
2ω = 47°
DISTORTION

SPHERICAL ABERRATION

FIG. 13B

ASTIGMATISM

FIG. 13C

DISTORTION

FIG. 13D

SPHERICAL ABERRATION

FIG. 13E

ASTIGMATISM

FIG. 13F

DISTORTION

OPTICAL APPARATUS

BACKGROUND OF THE INVENTION

1. Field of the Invention

The present invention relates to an optical apparatus having a digital image forming means, and more particularly to an optical apparatus arranged in such a manner that an optical means changes an aspect ratio (which is hereinafter defined as height-to-width ratio) of image information on a moving picture or a still picture photographed, by compressing or expanding either one of the vertical and horizontal lengths, then the image information with the aspect ratio thus modified is recorded in a recording medium such as a CCD having a pixel array arranged in a non-square lattice pattern with the small aspect ratio, and, upon sampling of square lattice from the image information formed in the recording medium, a distortion of the aspect ratio is corrected to output correct image information.

2. Related Background Art

Cost-performance ratios have been increasing these years with wide spread use of computer devices. This is realized in that relatively cheap devices are able to perform various image processing operations, which have been handled heretofore only by expensive large-scale devices, and demands to take a digitized image into a computer or the like have been increasing in various technical fields. Sampling is necessary for digitizing analog image information. A two-dimensional sampling technique needs to be employed for sampling of image information as being two-dimensional data. Normally, square lattices are frequently used for sampling because of easiness of handling of memory.

Presently, commonly used image pickup means for converting the image information into an electric signal is the CCD in which a plurality of light-receiving elements are arranged in a two-dimensional pattern. According to the television standards, the CCD is formed from a plurality of light-receiving elements arranged in a non-square lattice, for example approximately at a ratio of height:width=1.05:1. Therefore, if signal processing are performed while taking image information pieces from the respective light-receiving elements in the image pickup means with the plurality of light-receiving elements arranged in such a non-square lattice into a square lattice, the image would contract vertically to provide image information with a distorted aspect ratio.

A technique to prevent it is a method of resampling to achieve the ratio of height:width=1:1 upon performing the image processing. However, because a change of the sampling ratio of 1.05:1 to 1:1 is very small, moiré is likely to appear in the high-frequency region, resulting in forming a poor image. There is a method using a low-pass filter in order to prevent the moiré, but this method has a problem of difficult setting of the low-pass filter.

Further, the method by image processing requires separate digital circuits for the horizontal and vertical directions in an image processing circuit, thus having a problem that the circuit arrangement tends to become complex. These problems could be overcome if an image pickup means in which light-receiving elements are arranged in a square lattice pattern were used. However, most image pickup means are those having the pixel array determined according to the standards, as described above. Further, the image pickup means presently commonly and readily available include a small total number of pixels, and cannot fully meet the demands to achieve high definition.

SUMMARY OF THE INVENTION

An object of the present invention is to provide an optical apparatus having digital image forming means, wherein when a phototaking lens system forms image information on a surface of image pickup means in which a plurality of light-receiving elements are arranged in a non-square lattice pattern and the image information from the image pickup means is sampled in a square lattice to obtain a digital image, and the phototaking lens system is arranged to correct a distortion of aspect ratio of an image caused upon sampling in the square lattice, thereby being capable of easily obtaining a high-resolution digital image corrected for the distortion of aspect ratio.

The optical apparatus having the digital image forming means according to the present invention is characterized in that when the phototaking lens system forms the image information on the image pickup means in which the plurality of light-receiving elements are arranged in the non-square lattice pattern and a signal from the image pickup means is sampled in the square lattice to obtain a two-dimensional digital image, the phototaking lens system forms an image as optically correcting for the distortion of aspect ratio of image caused upon sampling in the square lattice.

Particularly, the optical apparatus is characterized in that an image is formed by the phototaking lens system for forming an image as modifying the image at an aspect ratio of approximately S:1 on the surface of the image pickup means in which the plurality of light-receiving elements are arranged at predetermined intervals in a ratio of S:1 (S≠1) in the vertical direction and the horizontal direction, and a digital image is obtained using an output signal from the image pickup means.

Further, the optical apparatus is characterized in that an image is formed by the phototaking lens system having a refractive power determined approximately at fy:fx=S:1 where fy and fx are focal lengths in the meridional direction and in the sagittal direction, respectively, on the surface of the image pickup means in which the plurality of light-receiving elements are arranged at predetermined intervals in the ratio of S:1 (S≠1) in the vertical direction and the horizontal direction, and a digital image is obtained using an output signal from the image pickup means.

Specifically, the optical apparatus is characterized in that the phototaking lens system comprises at least two toric surfaces or anamorphic surfaces, or a combination of a toric surface and an anamorphic surface, in that a focus section of the phototaking lens system has at least two toric surfaces, or in that the focus section of the phototaking lens system has at least two anamorphic surfaces.

DETAILED DESCRIPTION OF THE PREFERRED EMBODIMENTS

Figure 1:
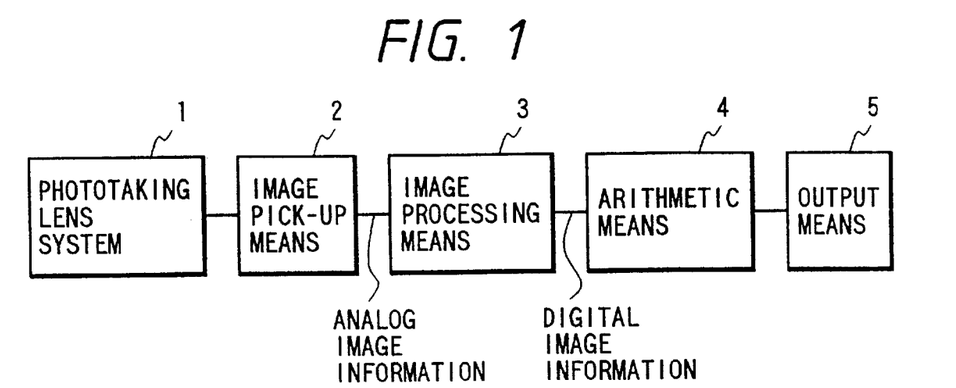
FIG. 1 is a block diagram to show the major part of Embodiment 1 of the present invention.

FIG. 1 is a block diagram to show the major part of Embodiment 1 of the present invention. In the drawing, reference numeral 1 designates a phototaking lens system, which forms image information of a moving picture or a still picture, etc., on a surface of an image pickup means 2. The image pickup means 2 is comprised of a CCD, for example, in which a plurality of light-receiving elements are arranged in a non-square lattice pattern. Numeral 3 denotes an image processing means, which converts an analog image signal obtained by the image pickup means 2 into a digital image signal after spatial sampling in the x, y directions.

Numeral 4 denotes an arithmetic means (computer), which uses digital image information after A/D conversion from the image processing means 3 as image data for image processing. Here, processing is the same for the horizontal direction and the vertical direction. Numeral 5 is an image output means, which outputs the digital image information image-processed by the arithmetic means 4 to a terminal, for example a CRT, a printer, a liquid crystal display, or the like. In the present embodiment each of the image pickup means 2, image processing means 3, and arithmetic means 4, etc., composes an element in the digital image forming means.

The phototaking lens system according to the present invention is arranged to have such an imaging characteristic as to correct for the distortion of aspect ratio of image information to be caused upon sampling in a square lattice while using the image pickup means in which the plurality of light-receiving elements are arranged in a non-square lattice pattern.

Specifically, when the optical apparatus employs the image pickup means in which the plurality of light-receiving elements are arranged at intervals in S:1 (S≠1) in the longitudinal direction (vertical direction or column direction) and the transverse direction (horizontal direction or row direction), the phototaking lens system is arranged as follows.

(a) The phototaking lens system is arranged to form the image information as modifying the aspect ratio to approximately S:1. Here, "approximately" means "within the range of ±20%," which is also applied in the following description.

(b) The phototaking lens system is arranged to make a ratio of the focal length fy in the vertical direction (meridional direction) and the focal length fx in the horizontal direction (sagittal direction) nearly equal to approximately S:1.

(c) At least two lens surfaces out of a plurality of lens surfaces composing the phototaking lens system are toric surfaces or anamorphic surfaces, or a combination of a toric surface and an anamorphic surface.

Here, toric surfaces include y-toric surfaces and x-toric surfaces. A y-toric surface is a surface obtained by defining a cross section on the yz plane by rdy and rotating a curve of the cross section about an axis parallel to the y axis in the yz plane with a radius of curvature of rdx, which satisfies the following equations.

$$Z = \frac{y^2}{rd\,y\left(1 + \mathrm{sqrt}\left[1 - \frac{y^2}{rd\,y^2}\right]\right)} + \tag{1}$$

$$\frac{x^2}{\left(rd\,x - \frac{y^2}{rd\,y\left(1 + \mathrm{sqrt}\left[1 - \frac{y^2}{rd\,y^2}\right]\right)}\right)\left(1 + \mathrm{sqrt}\left[1 - \frac{x^2}{\left(rd\,x - \frac{y^2}{rd\,y\left(1 + \mathrm{sqrt}\left[1 - \frac{y^2}{rd\,y^2}\right]\right)}\right)^2}\right]\right)}$$

$$Z = (x^2/rd\,x + y^2/rd\,y) \Big/ \left(1 + \sqrt{(1 - x^2/rd\,x^2 - y^2/rd\,y^2)}\right) \tag{2}$$

Next described are specific lens layouts of the phototaking lens system according to the present invention.

FIG. 2 to FIG. 8 are lens sectional views of Numerical Embodiments 1 to 7 of the phototaking lens system according to the present invention, and FIGS. 9A to 15F are aberration diagrams to show aberrations in Numerical Embodiments 1 to 7 of the phototaking lens system according to the present invention. In the aberration diagrams, FIGS. 9A, 9B, 9C, 10A, 10B, 10C, 11A, 11B, 11C, 12A, 12B, 12C, 13A, 13B, 13C, 14A, 14B, 14C, 15A, 15B, 15C each show aberrations with an object at infinity, while FIGS. 9D, 9E, 9F, 10D, 10E, 10F, 11D, 11E, 11F, 12D, 12E, 12F, 13D, 13E, 13F, 14D, 14E, 14F, 15D, 15E, 15F each show aberrations with an object at the nearest distance. In the figures, SP represents a stop, and IP the image plane.

Phototaking lens systems of the embodiments are arranged to satisfy the following relation:

approximately fy:fx=1.05:1 where fy is the focal length in the meridional direction and fx the focal length in the sagittal direction. Here, "approximately" means "within the range of ±20%."

Figure 2:
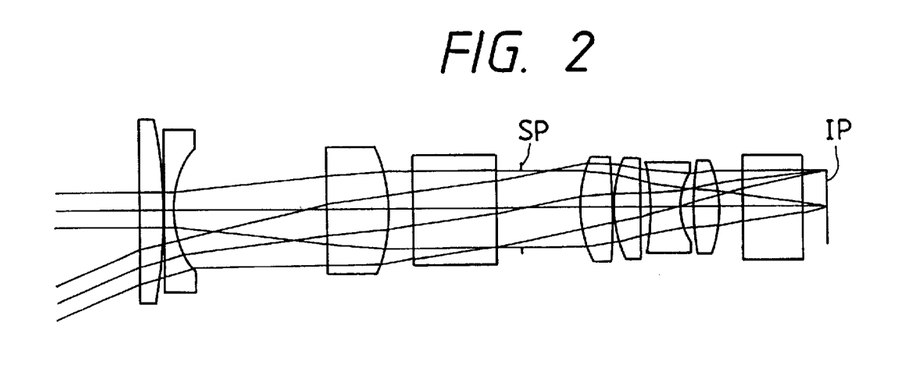
FIG. 2 is a lens sectional view of Numerical Embodiment 1 of the phototaking lens system according to the present invention.
Figure 3:
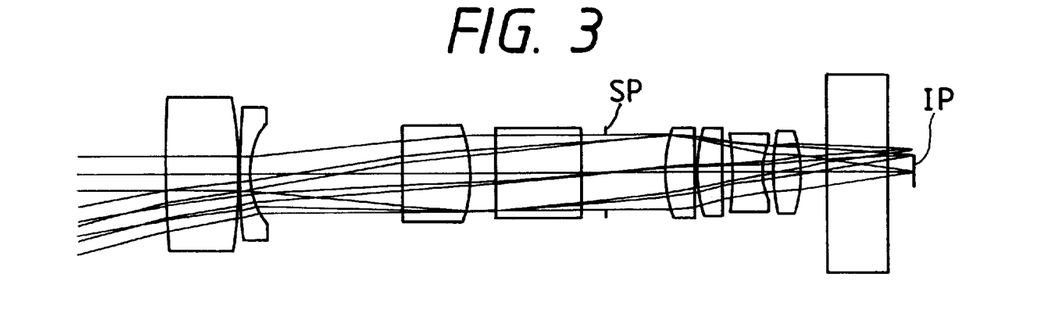
FIG. 3 is a lens sectional view of Numerical Embodiment 2 of the phototaking lens system according to the present invention.
Figure 5:
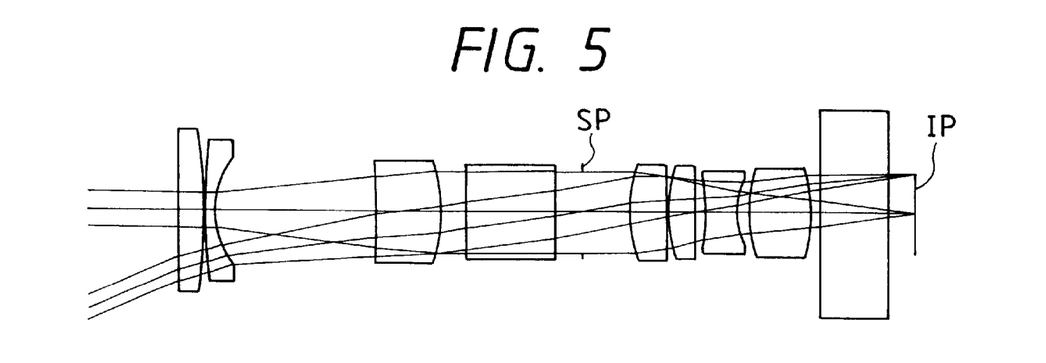
FIG. 5 is a lens sectional view of Numerical Embodiment 4 of the phototaking lens system according to the present invention.

In each of Numerical Embodiments 1, 2, 4 as shown in FIG. 2, FIG. 3, and FIG. 5, the phototaking lens system is composed of, in order from the object side, a positive lens with the both lens surfaces being convex, a negative lens with a concave surface opposed to the image plane side, a positive lens with a convex surface opposed to the image plane side, a glass block, a stop, a positive lens with the both lens surfaces being convex, a positive meniscus lens with a convex surface opposed to the object side, a negative lens with the both lens surfaces being concave, a positive lens with the both lens surfaces being convex, and a glass block, for example a filter.

Figure 4:
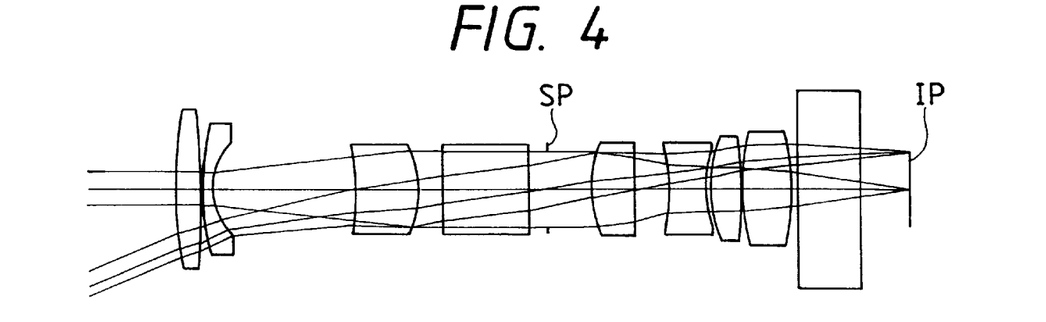
FIG. 4 is a lens sectional view of Numerical Embodiment 3 of the phototaking lens system according to the present invention.

In Numerical Embodiment 3 as shown in FIG. 4, the phototaking lens system is composed of, in order from the object side, a positive lens with the both lens surfaces being convex, a negative lens with a concave surface opposed to the image plane side, a positive lens with a convex surface opposed to the image plane side, a glass block, a stop, a positive lens with the both lens surfaces being convex, a negative lens with the both lens surfaces being concave, a positive lens with the both lens surfaces being convex, a positive lens with the both lens surfaces being convex, and a glass block, for example a filter.

The glass blocks provided in the optical paths of FIG. 2 to FIG. 5 are arranged, for example, to have a half mirror (not shown) inside for guiding part of light to a finder system (not shown).

Figure 6:
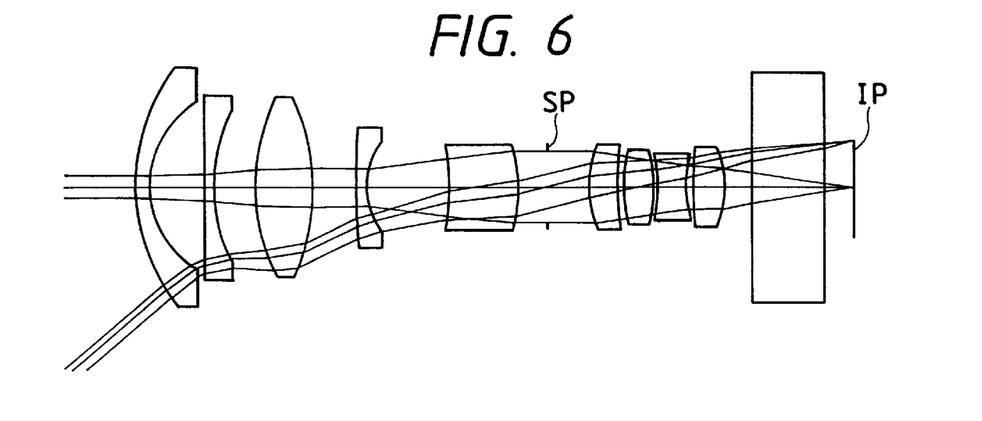
FIG. 6 is a lens sectional view of Numerical Embodiment 5 of the phototaking lens system according to the present invention.
Figure 7:
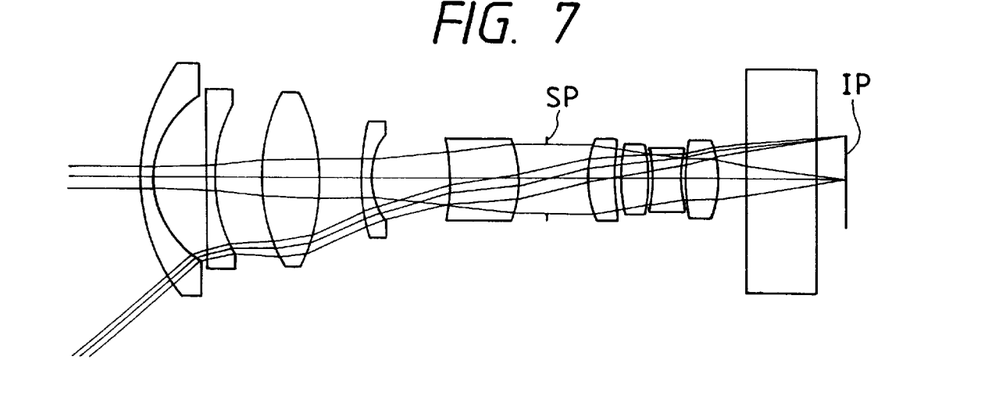
FIG. 7 is a lens sectional view of Numerical Embodiment 6 of the phototaking lens system according to the present invention.
Figure 8:
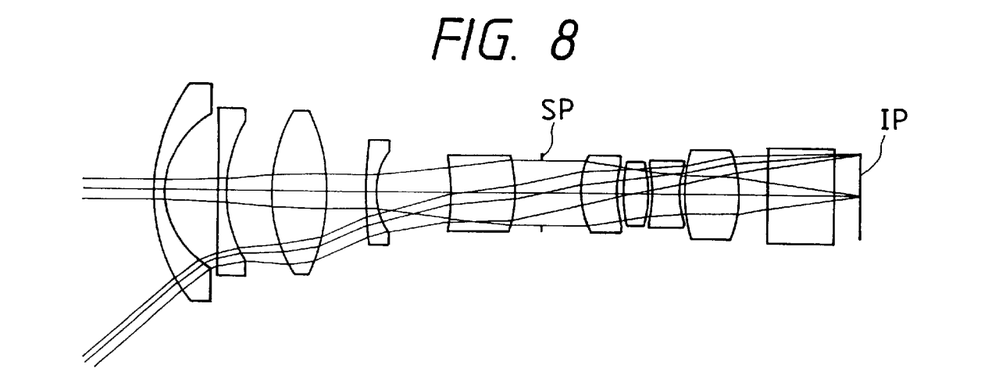
FIG. 8 is a lens sectional view of Numerical Embodiment 7 of the phototaking lens system according to the present invention.
Figure 9A:
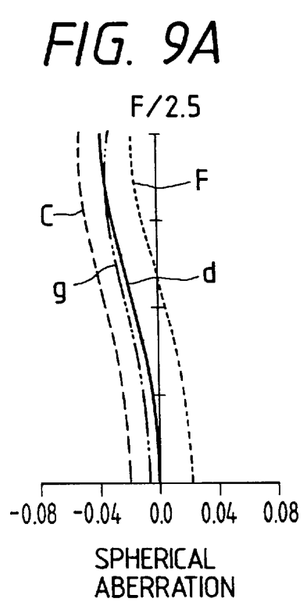
FIGS. 9A to 9F are aberration diagrams to show aberrations in Numerical Embodiment 1 of the phototaking lens system according to the present invention.
Figure 9B:
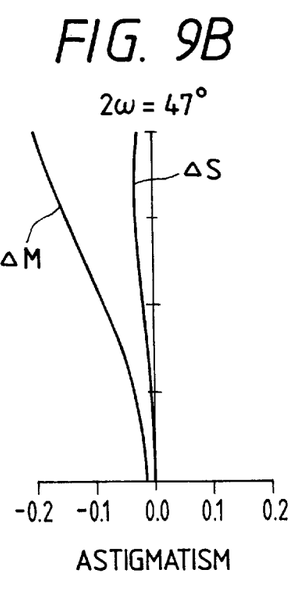
Figure 9C:
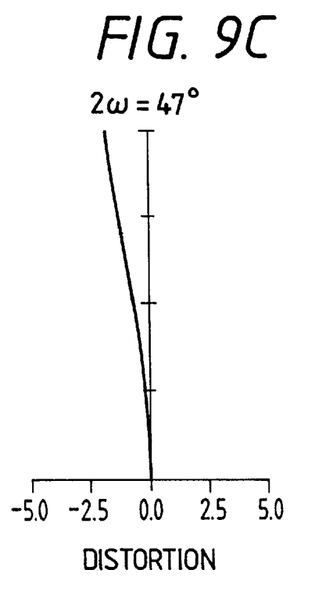
Figure 9D:
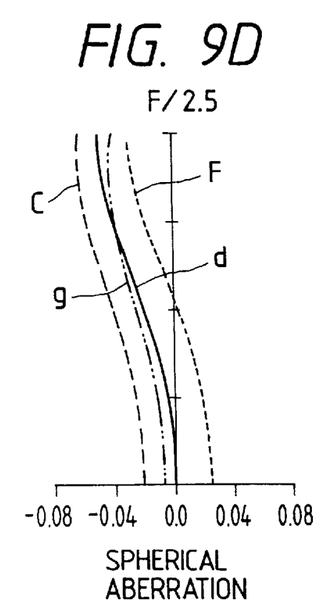
Figure 9E:
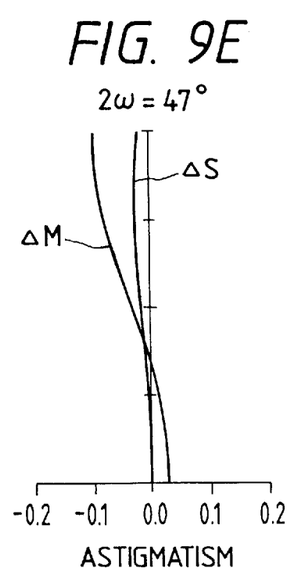
Figure 9F:
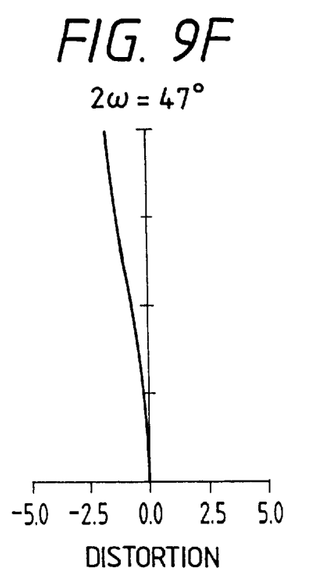
Figure 10A:
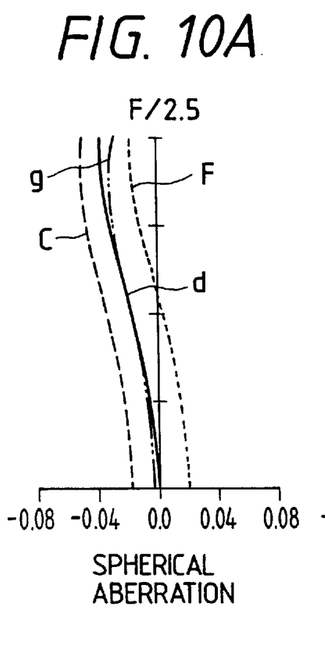
FIGS. 10A to 10F are aberration diagrams to show aberrations in Numerical Embodiment 2 of the phototaking lens system according to the present invention.
Figure 10B:
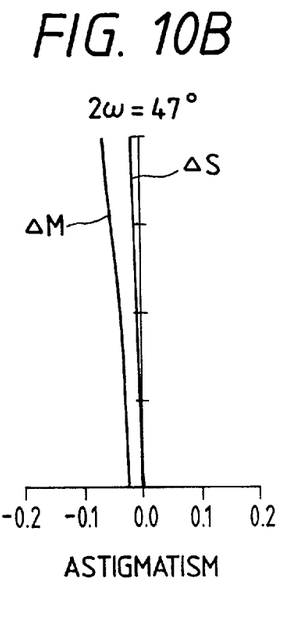
Figure 10C:
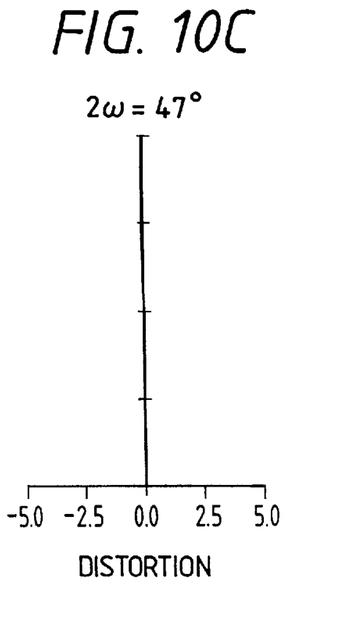
Figure 10D:
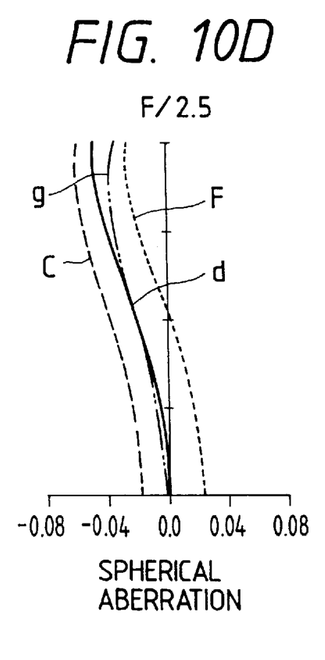
Figure 10E:
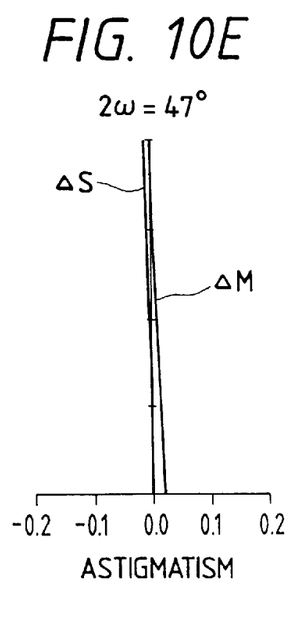
Figure 10F:
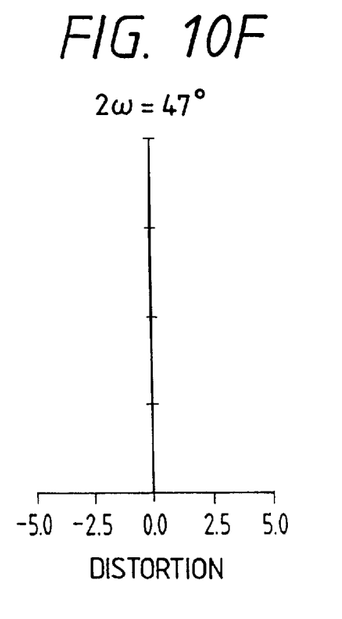
Figure 11A:
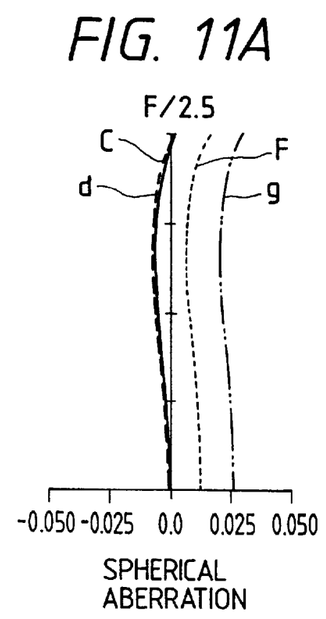
FIGS. 11A to 11F are aberration diagrams to show aberrations in Numerical Embodiment 3 of the phototaking lens system according to the present invention.
Figure 11B:
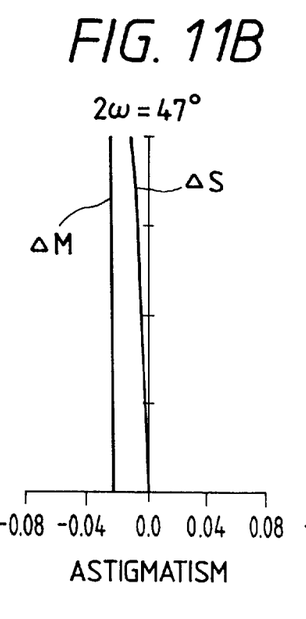
Figure 11C:
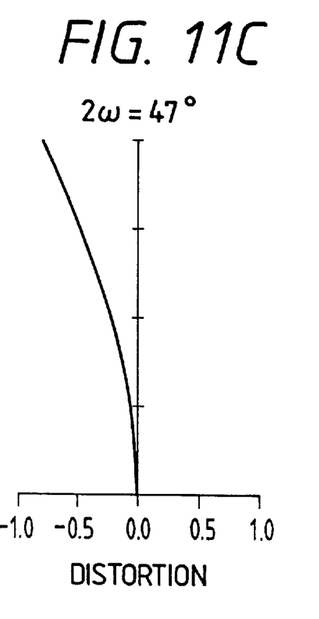
Figure 11D:
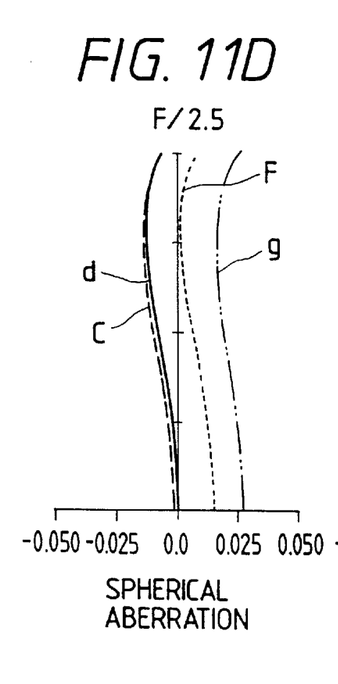
Figure 11E:
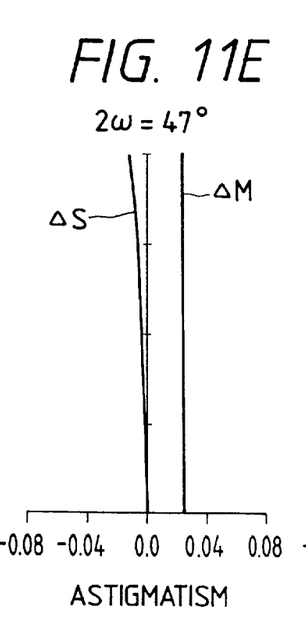
Figure 11F:
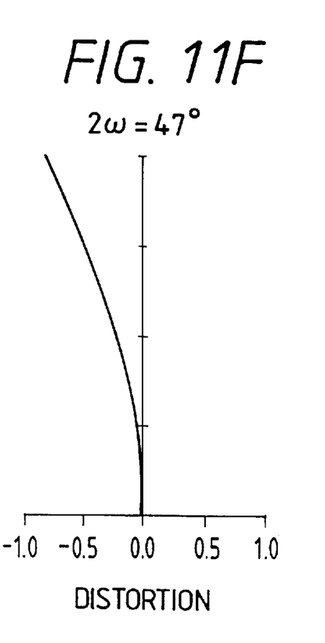
Figures 12A, 12B:
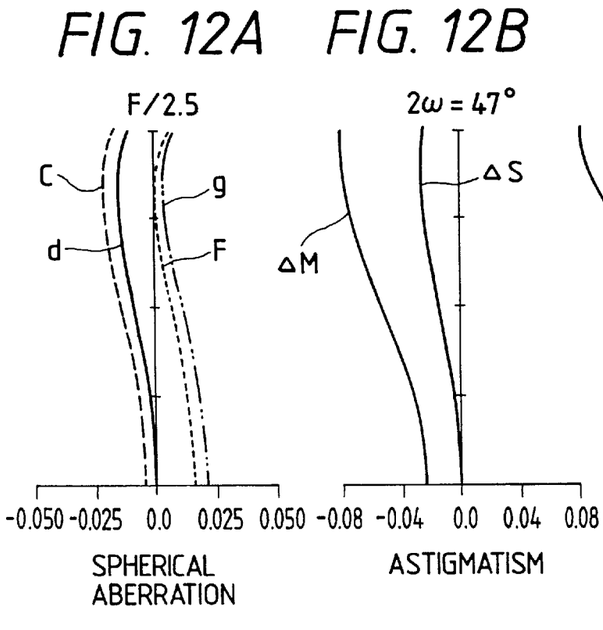
FIGS. 12A to 12F are aberration diagrams to show aberrations in Numerical Embodiment 4 of the phototaking lens system according to the present invention.
Figure 12C:
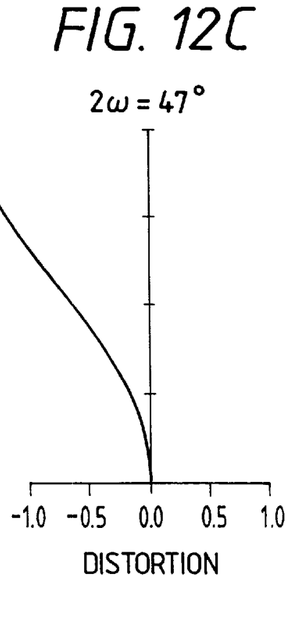
Figure 12D:
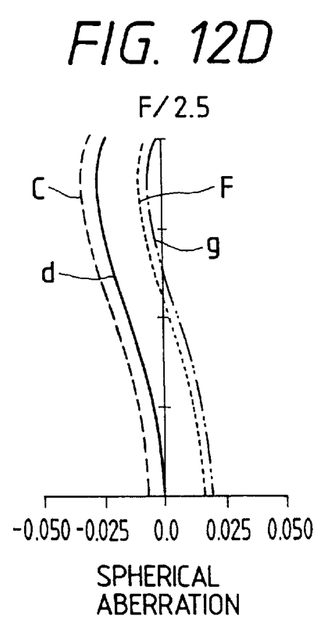
Figure 12E:
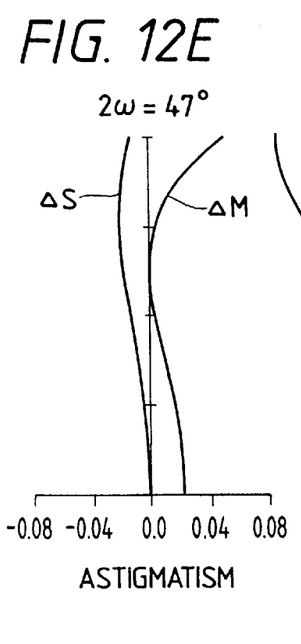
Figure 12F:
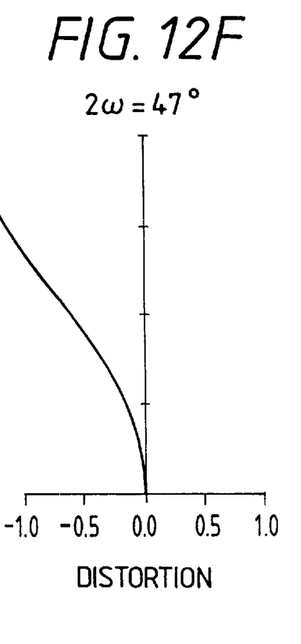
Figure 13A:
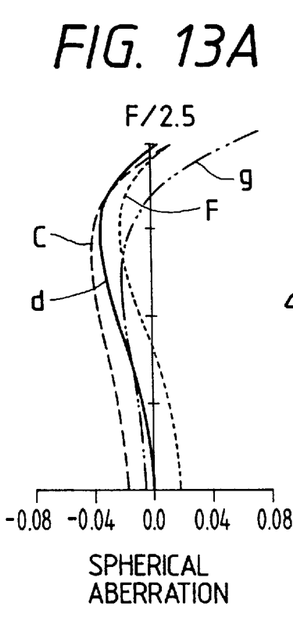
FIGS. 13A to 13F are aberration diagrams to show aberrations in Numerical Embodiment 5 of the phototaking lens system according to the present invention.
Figure 13B:
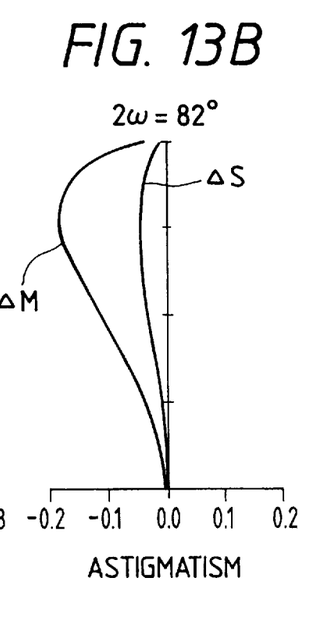
Figure 13C:
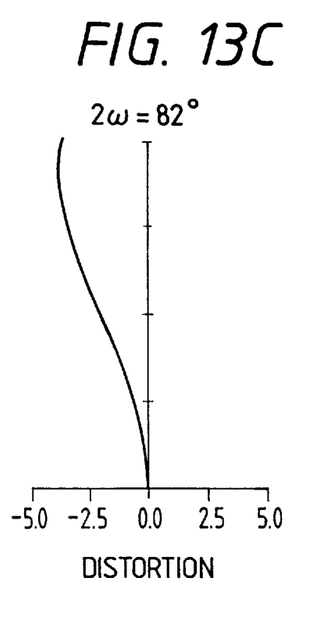
Figure 13D:
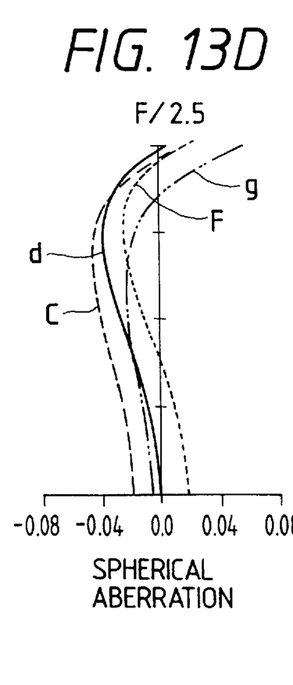
Figure 13E:
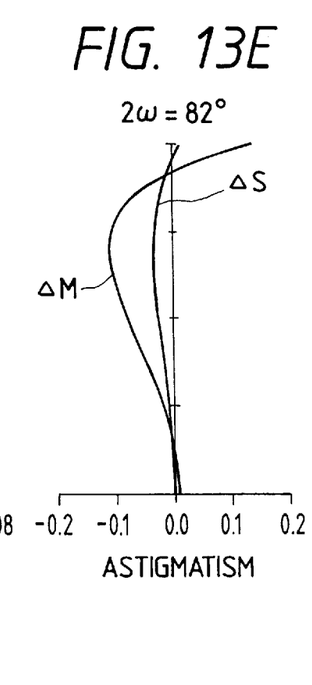
Figure 13F:
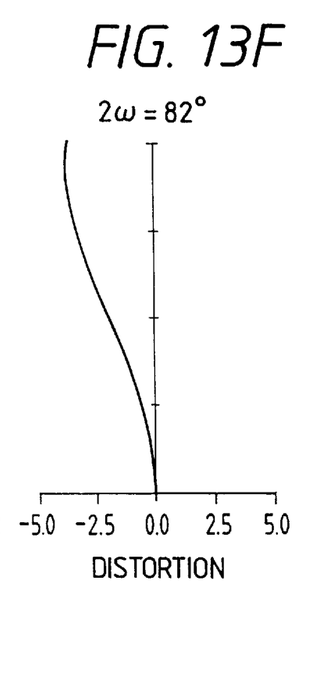
Figure 14A:
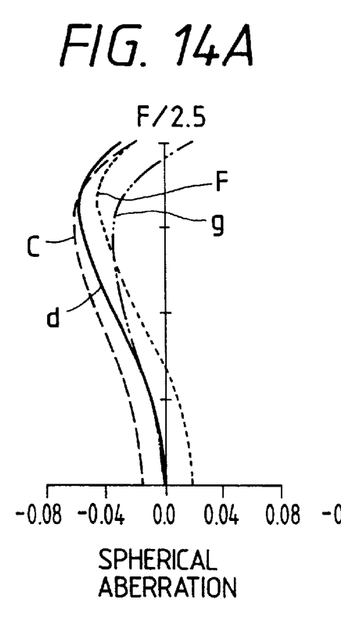
FIGS. 14A to 14F are aberration diagrams to show aberrations in Numerical Embodiment 6 of the phototaking lens system according to the present invention.
Figure 14B:
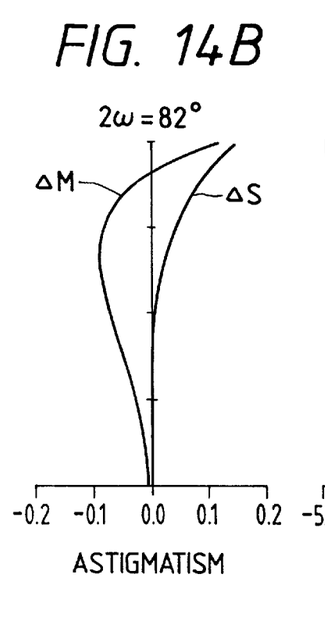
Figure 14C:
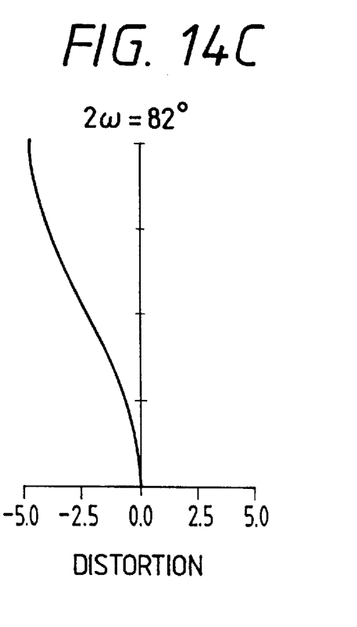
Figure 14D:
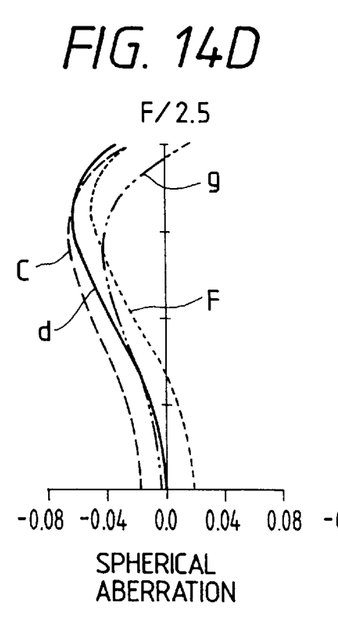
Figure 14E:
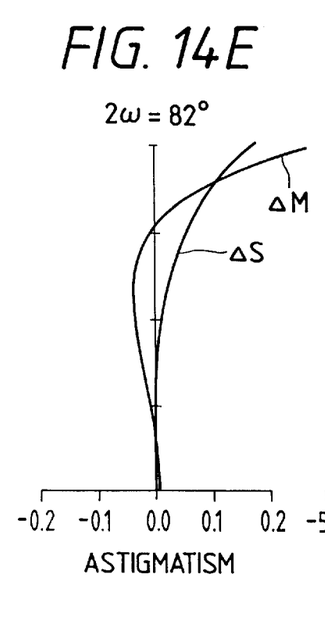
Figure 14F:
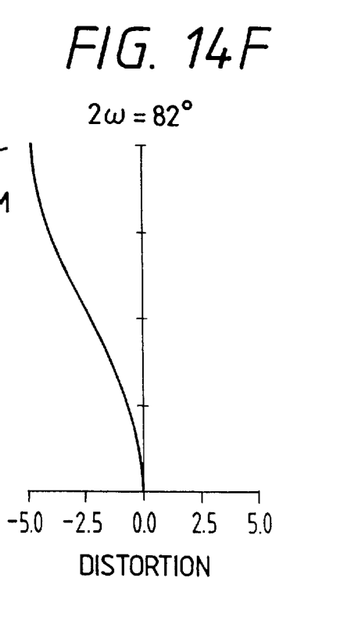
Figures 15A, 15B:
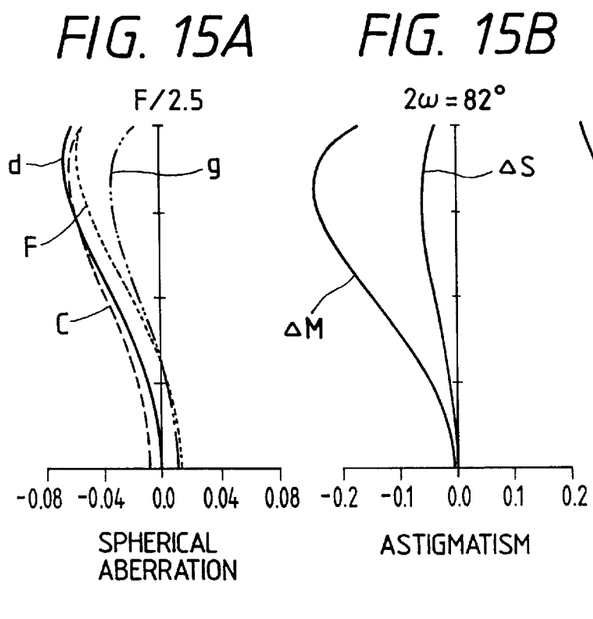
FIGS. 15A to 15F are aberration diagrams to show aberrations in Numerical Embodiment 7 of the phototaking lens system according to the present invention.
Figure 15C:
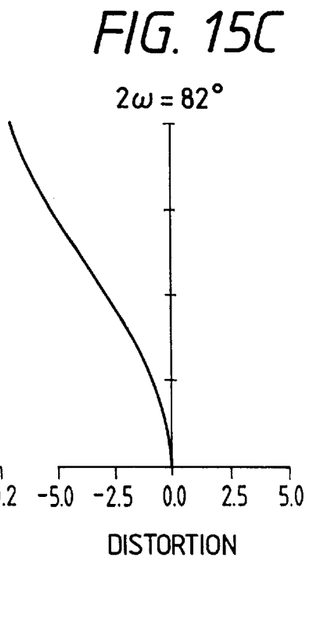
Figure 15D:
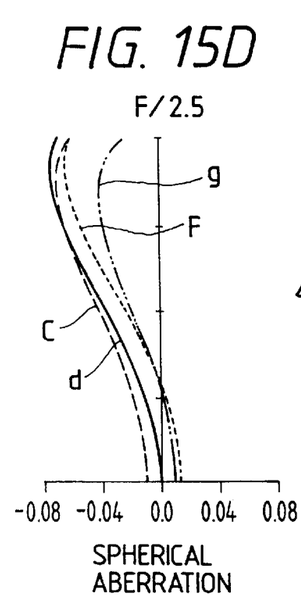
Figure 15E:
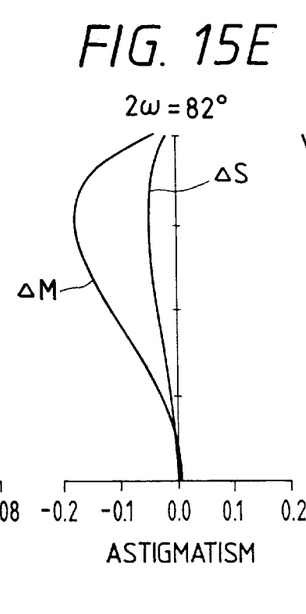
Figure 15F:
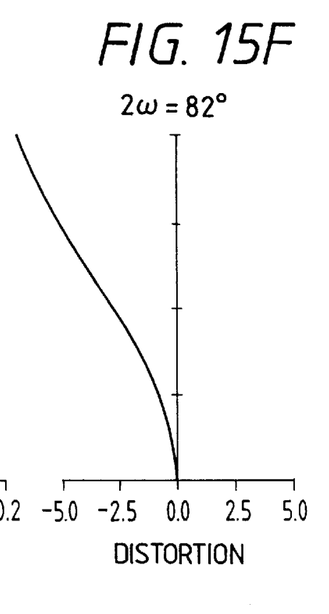

In each of Numerical Embodiments 5 to 7 as shown in FIG. 6 to FIG. 8, the phototaking lens system is composed of, in order from the object side, a negative meniscus lens with a convex surface opposed to the object side, a negative lens with a concave surface opposed to the image plane side, a positive lens with the both lens surfaces being convex, a negative meniscus lens with a convex surface opposed to the object side, a positive meniscus lens with a convex surface opposed to the image plane side, a stop, a positive meniscus lens with a convex surface opposed to the object side, a positive lens with the both lens surfaces being convex, a negative lens with the both lens surfaces being concave, a positive lens with the both lens surfaces being convex, and a glass block, for example a filter.

In Numerical Embodiment 1 the fourth and sixth surfaces are y-toric surfaces. In Numerical Embodiment 2 the first and sixth surfaces are y-toric surfaces. In Numerical Embodiment 4 the tenth to seventeenth surfaces compose a focus block, and the twelfth and seventeenth surfaces are anamorphic surfaces. Focus projection will give rise to a difference between the meridional image surface and the sagittal image surface. Then, these image surfaces were arranged to coincide with each other at the half of a maximum focus projection amount (where the object point is 20 cm from the front lens) and the meridional image surface was distributed before and after the sagittal image surface at the infinity and the nearest, whereby the difference between the image surfaces at the center of screen was within about ±23 μm. This value is within the depth of field in the present design example and is a value acceptable.

In Numerical Embodiment 4 the tenth to seventeenth surfaces compose a focus block and the tenth and seventeenth surfaces are y-toric surfaces. In Numerical Embodiment 5 the fourth and sixth surfaces are y-toric surfaces. In Numerical Embodiment 6 the eighth and tenth surfaces are y-toric surfaces. In Numerical Embodiment 7 the twelfth to nineteenth surfaces compose a focus block and the twelfth and nineteenth surfaces are y-toric surfaces. In Numerical Embodiments 1 to 7 focusing is made by the rearmost optical block in the entire lens system or phototaking lens system, but that group may be arranged as a focus block.

Numerical Embodiments of the present invention will be further detailed below. In Numerical Embodiments, ri represents a radius of curvature in the vertical direction (y direction), of the i-th lens surface in order from the object side, di a thickness and air space of the i-th lens from the object side, and ni and vi a refractive index and an Abbe number, respectively, of the i-th lens glass in order from the object side. The toric surfaces and anamorphic surfaces are explained based on Equations (1), (2) as described previously.

(Numerical Embodiment 1)

| | | | |
|---|---|---|---|
| fy = 7.35 | fx = 7.00 | fno = 2.5 | 2ω = 47° |
| r 1 = 239.18 | d 1 = 2.0 | n1 = 1.6968 | v1 = 55.5 |
| r 2 = −46.32 | d 2 = 0.15 | | |
| r 3 = −191.00 | d 3 = 0.7 | n2 = 1.7725 | v2 = 49.6 |
| r 4 = 8.55 | d 4 = 12.53 | | |
| r4dx = 7.94 | y-toric surface | | |
| r 5 = 601.71 | d 5 = 5.0 | n3 = 1.5174 | v3 = 52.4 |
| r 6 = −15.16 | d 6 = 2.0 | | |
| r6dx = −14.60 | y-toric surface | | |
| r 7 = ∞ | d 7 = 7.0 | n4 = 1.5163 | v4 = 64.1 |
| r 8 = ∞ | d 8 = 2.0 | | |
| r 9 = ∞ | d 9 = 4.92 | stop | |
| r10 = 10.57 | d10 = 2.5 | n5 = 1.6968 | v5 = 55.5 |
| r11 = −92.83 | d11 = 0.15 | | |
| r12 = 12.06 | d12 = 2.0 | n6 = 1.6968 | v6 = 55.5 |
| r13 = 55.87 | d13 = 0.82 | | |
| r14 = −21.89 | d14 = 2.45 | n7 = 1.80518 | v7 = 25.4 |
| r15 = 6.12 | d15 = 0.99 | | |
| r16 = 20.84 | d16 = 2.20 | n8 = 1.6031 | v8 = 60.7 |
| r17 = −10.48 | d17 = 1.92 | | |
| r18 = ∞ | d18 = 5.0 | n9 = 1.5163 | v9 = 64.1 |
| r19 = ∞ | d19 = 2.0 | | |

(Numerical Embodiment 2)

| | | | |
|---|---|---|---|
| fy = 7.35 | fx = 7.00 | fno = 2.5 | 2ω = 47° |
| r 1 = 114.59 | d 1 = 5.90 | n1 = 1.6968 | v1 = 55.5 |
| r1dx = 371.17 | y-toric surface | | |
| r 2 = −42.05 | d 2 = 0.15 | | |
| r 3 = 79.08 | d 3 = 0.7 | n2 = 1.7725 | v2 = 49.6 |
| r 4 = 7.09 | d 4 = 12.60 | | |
| r 5 = −82.84 | d 5 = 5.45 | n3 = 1.5174 | v3 = 52.4 |
| r 6 = −13.31 | d 6 = 2.10 | | |
| r6dx = −13.06 | y-toric surface | | |
| r 7 = ∞ | d 7 = 7.03 | n4 = 1.5163 | v4 = 64.1 |
| r 8 = ∞ | d 8 = 2.01 | | |
| r 9 = ∞ | d 9 = 4.96 | stop | |
| r10 = 10.62 | d10 = 2.51 | n5 = 1.6968 | v5 = 55.5 |
| r11 = −93.34 | d11 = 0.15 | | |
| r12 = 12.12 | d12 = 2.01 | n6 = 1.6968 | v6 = 55.5 |
| r13 = 56.17 | d13 = 0.83 | | |
| r14 = −22.01 | d14 = 2.46 | n7 = 1.80518 | v7 = 25.4 |
| r15 = 6.15 | d15 = 0.99 | | |
| r16 = 20.96 | d16 = 2.21 | n8 = 1.6031 | v8 = 60.7 |
| r17 = −10.54 | d17 = 1.95 | | |
| r18 = ∞ | d18 = 5.02 | n9 = 1.5163 | v9 = 64.1 |
| r19 = ∞ | d19 = 2.06 | | |

(Numerical Embodiment 3)

| | | | |
|---|---|---|---|
| fy = 7.35 | fx = 7.00 | fno = 2.5 | 2ω = 47° |
| r 1 = 38.53 | d 1 = 2.0 | n1 = 1.6968 | v1 = 55.5 |
| r 2 = −76.23 | d 2 = 0.15 | | |
| r 3 = 23.68 | d 3 = 0.7 | n2 = 1.7725 | v2 = 49.6 |
| r 4 = 5.32 | d 4 = 11.94 | | |
| r 5 = −22.26 | d 5 = 5.0 | n3 = 1.5174 | v3 = 52.4 |

(Numerical Embodiment 1)

| | | | |
|---|---|---|---|
| r 6 = −9.39 | d 6 = 2.0 | | |
| r 7 = ∞ | d 7 = 7.0 | n4 = 1.5163 | ν4 = 64.1 |
| r 8 = ∞ | d 8 = 1.5 | | |
| r 9 = ∞ | d 9 = 3.62 | stop | |
| r10 = 10.53 | d10 = 3.60 | n5 = 1.6968 | ν5 = 55.5 |
| r11 = −192.89 | d11 = 2.80 | | |
| r12 = 14.82 | d12 = 2.94 | n6 = 1.80518 | ν6 = 25.4 |
| r12dx = −13.17 | anamorphic surface | | |
| r13 = 8.69 | d13 = 0.46 | | |
| r14 = 11.59 | d14 = 2.5 | n7 = 1.6968 | ν7 = 55.5 |
| r15 = −39.93 | d15 = 0.15 | | |
| r16 = 22.82 | d16 = 3.94 | n8 = 1.7725 | ν8 = 49.6 |
| r17 = −26.29 | d17 = 0.62 | | |
| r17dx = −18.75 | anamorphic surface | | |
| r18 = ∞ | d18 = 5.0 | n9 = 1.5163 | ν9 = 64.1 |
| r19 = ∞ | d19 = 4.05 | | |

(Numerical Embodiment 4)

| | | | |
|---|---|---|---|
| fy = 7.35 | fx = 7.00 | fno = 2.5 | 2ω = 47° |
| r 1 = 239.18 | d 1 = 2.0 | n1 = 1.6968 | ν1 = 55.5 |
| r 2 = −46.32 | d 2 = 0.15 | | |
| r 3 = 78.65 | d 3 = 0.7 | n2 = 1.7725 | ν2 = 49.6 |
| r 4 = 7.05 | d 4 = 12.53 | | |
| r 5 = −92.78 | d 5 = 5.0 | n3 = 1.5174 | ν3 = 52.4 |
| r 6 = −12.98 | d 6 = 2.0 | | |
| r 7 = ∞ | d 7 = 7.0 | n4 = 1.5163 | ν4 = 64.1 |
| r 8 = ∞ | d 8 = 2.0 | | |
| r 9 = ∞ | d 9 = 3.68 | stop | |
| r10 = 10.11 | d10 = 2.95 | n5 = 1.6968 | ν5 = 55.5 |
| r10dx = 10.37 | y-toric surface | | |
| r11 = −85.16 | d11 = 0.15 | | |
| r12 = 13.34 | d12 = 2.0 | n6 = 1.6968 | ν6 = 55.5 |
| r13 = 122.20 | d13 = 0.82 | | |
| r14 = −19.63 | d14 = 2.45 | n7 = 1.80518 | ν7 = 25.4 |
| r15 = 5.76 | d15 = 0.99 | | |
| r16 = 12.52 | d16 = 4.64 | n8 = 1.6031 | ν8 = 60.7 |
| r17 = −14.12 | d17 = 0.68 | | |
| r18dx = −10.93 | y-toric surface | | |
| r18 = ∞ | d18 = 5.0 | n9 = 1.5163 | ν9 = 64.1 |
| r19 = ∞ | d19 = 2.0 | | |

(Numerical Embodiment 5)

| | | | |
|---|---|---|---|
| fy = 4.116 | fx = 3.920 | fno = 2.5 | 2ω = 82° |
| r 1 = 14.10 | d 1 = 1.00 | n 1 = 1.7725 | ν1 = 49.6 |
| r 2 = 7.14 | d 2 = 4.03 | | |
| r 3 = 679.21 | d 3 = 0.7 | n 2 = 1.7725 | ν2 = 49.6 |
| r 4 = 12.85 | d 4 = 2.89 | | |
| r4dx = 10.54 | y-toric surface | | |
| r 5 = 13.62 | d 5 = 4.2 | n 3 = 1.5317 | ν3 = 48.9 |
| r 6 = −15.02 | d 6 = 3.0 | | |
| r6dx = −12.85 | y-toric surface | | |
| r 7 = 48.25 | d 7 = 0.7 | n 4 = 1.5163 | ν4 = 64.1 |
| r 8 = 5.64 | d 8 = 5.72 | | |
| r 9 = −19.86 | d 9 = 5.0 | n 5 = 1.7725 | ν5 = 49.6 |
| r10 = −10.19 | d10 = 2.0 | | |
| r11 = ∞ | d11 = 3.00 | stop | |
| r12 = 7.10 | d12 = 2.0 | n 6 = 1.72 | ν6 = 50.2 |
| r13 = 14.97 | d13 = 0.5 | | |
| r14 = 13.76 | d14 = 2.0 | n 7 = 1.72 | ν7 = 50.2 |
| r15 = −11.56 | d15 = 0.25 | | |
| r16 = −8.36 | d16 = 2.05 | n 8 = 1.8052 | ν8 = 25.4 |
| r17 = 5.79 | d17 = 0.49 | | |
| r18 = 24.55 | d18 = 2.2 | n 9 = 1.8348 | ν9 = 42.7 |
| r19 = −8.36 | d19 = 2.0 | | |
| r20 = ∞ | d20 = 5.0 | n10 = 1.5163 | ν10 = 64.1 |
| r21 = ∞ | d21 = 1.99 | | |

(Numerical Embodiment 6)

| | | | |
|---|---|---|---|
| fy = 4.116 | fx = 3.920 | fno = 2.5 | 2ω = 82° |
| r 1 = 14.10 | d 1 = 1.00 | n 1 = 1.7725 | ν1 = 49.6 |
| r 2 = 7.14 | d 2 = 4.03 | | |
| r 3 = 679.21 | d 3 = 0.7 | n 2 = 1.7725 | ν2 = 49.6 |
| r 4 = 12.04 | d 4 = 3.40 | | |
| r 5 = 13.62 | d 5 = 4.2 | n 3 = 1.5317 | ν3 = 48.9 |
| r 6 = −15.02 | d 6 = 3.0 | | |
| r 7 = 17.14 | d 7 = 0.69 | n 4 = 1.5163 | ν4 = 64.1 |
| r 8 = 5.44 | d 8 = 5.71 | | |
| r8dx = 4.95 | y-toric surface | | |

(Numerical Embodiment 1)

| | | | |
|---|---|---|---|
| r 9 = −12.94 | d 9 = 4.99 | n 5 = 1.7725 | ν5 = 49.6 |
| r10 = −9.27 | d10 = 1.99 | | |
| r10dx = −8.97 | y-toric surface | | |
| r11 = ∞ | d11 = 2.99 | stop | |
| r12 = 7.09 | d12 = 1.99 | n 6 = 1.72 | ν6 = 50.2 |
| r13 = 14.96 | d13 = 0.49 | | |
| r14 = 13.74 | d14 = 1.99 | n 7 = 1.72 | ν7 = 50.2 |
| r15 = −11.55 | d15 = 0.25 | | |
| r16 = −8.35 | d16 = 2.05 | n 8 = 1.8052 | ν8 = 25.4 |
| r17 = 5.78 | d17 = 0.48 | | |
| r18 = 24.52 | d18 = 2.19 | n 9 = 1.8348 | ν9 = 42.7 |
| r19 = −8.35 | d19 = 1.99 | | |
| r20 = ∞ | d20 = 4.99 | n10 = 1.5163 | ν10 = 64.1 |
| r21 = ∞ | d21 = 2.02 | | |

(Numerical Embodiment 7)

| | | | |
|---|---|---|---|
| fy = 4.116 | fx = 3.920 | fno = 2.5 | 2ω = 82 |
| r 1 = 14.10 | d 1 = 1.00 | n 1 = 1.7725 | ν1 = 49.6 |
| r 2 = 7.14 | d 2 = 4.03 | | |
| r 3 = 679.21 | d 3 = 0.7 | n 2 = 1.7725 | ν2 = 49.6 |
| r 4 = 12.04 | d 4 = 3.40 | | |
| r 5 = 13.62 | d 5 = 4.2 | n 3 = 1.5317 | ν3 = 48.9 |
| r 6 = −15.33 | d 6 = 3.0 | | |
| r 7 = 48.25 | d 7 = 0.7 | n 4 = 1.5163 | ν4 = 64.1 |
| r 8 = 5.64 | d 8 = 5.72 | | |
| r 9 = −19.86 | d 9 = 5.0 | n 5 = 1.7725 | ν5 = 49.6 |
| r10 = −10.19 | d10 = 2.0 | | |
| r11 = ∞ | d11 = 3.00 | stop | |
| r12 = 6.91 | d12 = 2.96 | n 6 = 1.72 | ν6 = 50.2 |
| r12dx = 7.12 | y-toric surface | | |
| r13 = 8.73 | d13 = 0.5 | | |
| r14 = 12.44 | d14 = 2.0 | n 7 = 1.72 | ν7 = 50.2 |
| r15 = −9.16 | d15 = 0.25 | | |
| r16 = −7.06 | d16 = 2.05 | n 8 = 1.8052 | ν8 = 25.4 |
| r17 = 6.30 | d17 = 0.49 | | |
| r18 = 13.75 | d18 = 4.27 | n 9 = 1.8348 | ν9 = 42.7 |
| r19 = −9.01 | d19 = 2.0 | | |
| r19dx = −8.16 | y-toric surface | | |
| r20 = ∞ | d20 = 5.0 | n10 = 1.5163 | ν10 = 64.1 |
| r21 = ∞ | d21 = 2.01 | | |

The present invention can achieve the optical apparatus having the digital image forming means wherein when the phototaking lens system forms the image information on the surface of the image pickup means in which the plurality of light-receiving elements are arranged in a non-square lattice pattern and the image information from the image pickup means is sampled in a square lattice to obtain a digital image, the phototaking lens system is arranged to correct the distortion of aspect ratio of image caused upon sampling in the square lattice, thereby being capable of easily obtaining a high-resolution digital image corrected for the distortion of aspect ratio.

What is claimed is:

1. An optical apparatus comprising:

image pickup means in which a plurality of light-receiving elements are arranged at predetermined intervals in a ratio of S:1 (S≠1) in a longitudinal direction and a transverse direction; and a phototaking lens for forming an image on said image pickup means, said phototaking lens having an optical power to satisfy substantially fy:fx=S:1 where fy, fx are focal lengths in the longitudinal direction and the transverse direction, respectively, so as to vary a size of the image in the longitudinal direction and the transverse direction.

2. The optical apparatus according to claim 1, further comprising means for converting an output signal from said image pickup means into a digital signal.

3. The optical apparatus according to claim 1, wherein said phototaking lens has at least two toric surfaces or anamorphic surfaces.

4. The optical apparatus according to claim 1, wherein a focus section of said phototaking lens has at least two toric surfaces.

5. The optical apparatus according to claim 1, wherein a focus section of said phototaking lens has at least two toric surfaces.

* * * * *

UNITED STATES PATENT AND TRADEMARK OFFICE
CERTIFICATE OF CORRECTION

PATENT NO. : 5,905,597
DATED : May 18, 1999
INVENTOR(S) : Satoru Mizouchi, et al.

It is certified that error appears in the above-identified patent and that said Letters Patent is hereby corrected as shown below:

Col. 7, line 2, delete "(Numerical Embodiment 1)" and insert -- (Numerical Embodiment 3) --.
Col. 8, line 2, delete "(Numerical Embodiment 1)" and insert -- (Numerical Embodiment 6) --.
Col. 8, line 17, delete "82" insert -- 82° --.

Signed and Sealed this

Fourth Day of July, 2000

Attest:

Q. TODD DICKINSON

*Attesting Officer*　　　　*Director of Patents and Trademarks*